United States Patent [19]
Ikeda

[11] Patent Number: 5,822,532
[45] Date of Patent: *Oct. 13, 1998

[54] CENTRALIZED RESOURCE SUPERVISING SYSTEM FOR A DISTRIBUTED DATA NETWORK

[75] Inventor: Masahiro Ikeda, Kanagawa, Japan

[73] Assignee: Fuji Xerox Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 360,117

[22] Filed: Dec. 20, 1994

Related U.S. Application Data

[63] Continuation of Ser. No. 943,542, Sep. 11, 1992, abandoned.

[30] Foreign Application Priority Data

Sep. 13, 1991 [JP] Japan .................................... 3-290297

[51] Int. Cl.⁶ .............................. G06F 11/00; G06F 11/30
[52] U.S. Cl. ................................ 395/200.54; 395/200.53; 395/184.01
[58] Field of Search ..................................... 395/200, 650, 395/700, 725, 800, 200.02, 200.03, 200.11, 200.53, 200.54, 200.56, 183.01, 183.06, 184.01; 364/DIG. 1, DIG. 2; 340/825.06; 370/112

[56] References Cited

U.S. PATENT DOCUMENTS

| | | | |
|---|---|---|---|
| 3,346,851 | 10/1967 | Thornton et al. | 364/200 |
| 4,545,013 | 10/1985 | Lyon et al. | 370/20.1 |
| 4,644,532 | 2/1987 | George et al. | 370/94 |
| 4,751,702 | 6/1988 | Beier et al. | 371/9 |
| 4,780,821 | 10/1988 | Crossley | 395/650 |
| 4,941,170 | 7/1990 | Herbst | 379/100 |
| 5,043,881 | 8/1991 | Hamazaki | 364/200 |
| 5,049,873 | 9/1991 | Robins et al. | 340/825.06 |
| 5,101,348 | 3/1992 | Arrowood et al. | 395/200 |
| 5,109,486 | 4/1992 | Seymour | 395/200.11 |
| 5,115,499 | 5/1992 | Stiffler et al. | 395/425 |
| 5,119,493 | 6/1992 | Janis et al. | 395/650 |
| 5,121,486 | 6/1992 | Kurihara et al. | 395/325 |
| 5,173,939 | 12/1992 | Abadi et al. | 380/25 |
| 5,177,680 | 1/1993 | Tsukino et al. | 364/401 |
| 5,220,674 | 6/1993 | Morgan et al. | 395/800 |
| 5,226,120 | 7/1993 | Brown et al. | 395/200 |
| 5,226,172 | 7/1993 | Seymour et al. | 395/800 |
| 5,247,664 | 9/1993 | Thompson et al. | 395/600 |
| 5,272,464 | 12/1993 | Jorgensen | 340/438 |
| 5,361,347 | 11/1994 | Glider et al. | 395/575 |
| 5,432,789 | 7/1995 | Armstrong et al. | 370/92 |
| 5,483,631 | 1/1996 | Nagai et al. | 395/155 |
| 5,504,863 | 4/1996 | Yoshida | 395/184.01 |
| 5,504,921 | 4/1996 | Dev et al. | 395/800 |
| 5,535,335 | 7/1996 | Cox et al. | 395/200.11 |

OTHER PUBLICATIONS

Johna Till; "Modem Manager Monitors A Variety of Devices", Electronic Design, Jun. 22, 1989, pp. 123–124.
Guide for 8000 INS System Supervisors, Fuji Xerox Co. Ltd., 1st edition, vol. 1, pp. 261–264, Jan. 1987.
Guide For Local Area Network, Akihiro Uetani, et al., Maruzen Co., Ltd., on March 25, Heisei Gannen (1988).

*Primary Examiner*—Meng-Al T. An
*Attorney, Agent, or Firm*—Finnegan, Henderson, Farabow, Garrett & Dunner, L.L.P.

[57] ABSTRACT

A network resource supervising system for supervising the resources in a network in a centralized manner, comprising resource data control table means for storing data on the resources in a given format, resource data retrieving means which picks up desired data on the resources stored in the table means and retrieves data base (not shown) containing the data on the resources distributed in the network, and alters the contents of the table means according to the result of the pick-up and retrieval operations, resource data supervising means for searching generation and changes of the resource data stored in the table means, and display control means having a display section for visually presenting the resource data of the table means.

14 Claims, 7 Drawing Sheets

MAIL FORMAT 60

| \*\*\*SUPERVISING RESULT REPORT MAIL\*\*\* | | |
|---|---|---|
| 20-April-1991, 11:23:31 | | |
| RESOURCE NAME | TYPE OF SERVICE | CONTENTS OF REPORT |
| AAA<br>BBB<br>CCC<br>DDD | FILE SERVICE<br>PRINT SERVICE<br>MAIL SERVICE<br>FILE SERVICE | DISK 94% FULL<br>REFILL OF TONER IS REQUIRED<br>DATABASE 92% FULL<br>NO RESPONSE |

FIG. 7

FILE FORMAT 70

| \*\*\*SUPERVISING RESULT REPORT FILE\*\*\* | | |
|---|---|---|
| 20-April-1991, 11:23:31 | | |
| RESOURCE NAME | TYPE OF SERVICE | CONTENTS OF REPORT |
| AAA<br>BBB<br>CCC<br>DDD | FILE SERVICE<br>PRINT SERVICE<br>MAIL SERVICE<br>FILE SERVICE | DISK 94% FULL<br>REFILL OF TONER IS REQUIRED<br>DATABASE 92% FULL<br>NO RESPONSE |

FIG. 8

PRINT FORMAT 80

| \*\*\*SUPERVISING RESULT REPORT PRINT-OUT\*\*\* | | |
|---|---|---|
| 20-April-1991, 11:23:31 | | |
| RESOURCE NAME | TYPE OF SERVICE | CONTENTS OF REPORT |
| AAA<br>BBB<br>CCC<br>DDD | FILE SERVICE<br>PRINT SERVICE<br>MAIL SERVICE<br>FILE SERVICE | DISK 94% FULL<br>REFILL OF TONER IS REQUIRED<br>DATABASE 92% FULL<br>NO RESPONSE |

FIG. 9

CENTRALIZED RESOURCE SUPERVISING SYSTEM FOR A DISTRIBUTED DATA NETWORK

This application is a continuation, of application Ser. No. 07/943,542 filed Sep. 11, 1992 abandoned.

BACKGROUND OF THE INVENTION

The present invention relates to a network resource supervising system, and more particularly to a network resource supervising system for a distributed data processing system including mainly a local area network (LAN), such as an ETHERNET.

In a conventional distributed data processing system, it is common practice that resources are individually controlled by personal computers and work stations, which are distributed at appropriate locations in a network. In the data processing system, states of resources distributed in a network cannot be grasped in a centralized manner. Accordingly, it is impossible to detect specific operating states when data processing is performed in the network, and to grasp occurrence of troubles and their states. For details of the prior art, reference is made to "Guide for 8000 INS System Supervisors (Fundamental Course) written and issued by Fuji Xerox Co. Ltd. on January 1987, 1st edition, Vol. 1, pp 261 to 264, and "Guide for Local Area Network (Revised Work Station Series, 2nd Edition)" written by Akihiro Uetani, et al., issued by Maruzen Co., Ltd. on March 25, Heisei Gannen (1988).

As described above, in the prior distributed data processing system, the states of the resources distributed in a network cannot be grasped in a centralized manner. Accordingly, it is impossible to detect specific operating states when data processing is executed in the network, and to grasp occurrence of troubles and their states. Accordingly, the historical states of the network can hardly be grasped.

SUMMARY OF THE INVENTION

The present invention has been made in view of the above circumstances and has an object to provide a network resource supervising system which enables a specific system supervisor to grasp the historical data on states of resources distributed in a network, improves the working efficiency in sequentially searching individual resources, and can exactly detect specific operating states when data processing is performed in a network and can also exactly catch trouble occurrence and to grasp states of the troubles.

To achieve the above object, there is provided a network resource supervising system for supervising the resources in a network in a centralized manner, which is coupled with a network including resource control data base for controlling the resources in a network, the network resource supervising system comprising: resource data retrieving means for searching the resource data control data base and for collecting attributive data on the respective resources in the network; resource state data collecting means for collecting state data representing states of the respective resources; resource data control table means for storing therein in a given format the resource attribute data collected by the resource data retrieving means and the state data of the resources collected by the resource state data collecting means; at least one of electronic mail means for transmitting the state data of the respective resources that are stored in the resource data control table means, in the form of an electronic mail, file forming means for forming the state data of the respective resources that are stored in the resource data control table means, into a file, and print forming means for printing out the state data of the respective resources that are stored in the resource data control table means; and means for designating the method of reporting resource states by selecting one of the electronic mail transmitting means, file forming means, and print means.

Generally, a network for data processing is provided with a station for controlling the resources in the network and the data on users. The station contains data base for resource control (resource control data base). The data base stores resource data containing attributive data of the resources in the network, such as names of the resources and network addresses.

The resource data retrieving means accesses the resource control data base and collects the resource data in the network. The resource data thus collected is registered in the resource data control table means. The resource data control table means stores the resource data including attributive data, such as resource names and network addresses, and state data representing the present resource operating states (e.g., normally running and being stopped owing to trouble) in a correspondingly tabulated manner.

The resource state data collecting means collects state data on the resources designated by the respective resource data stored in the resource data control table. Two methods, for example, are employed for collecting the resource state data; One is to inquire of the registered resources about their states. The other is to monitor packets flowing in the network and to catch the data on the resource states. The collected state data is stored in the resource data control table means, thereby to register or update the state data.

At least one of the electronic mail transmitting means, file forming means, and print means is selected for reporting resource states data stored in the resource data control table means. By using the reporting method designating means, the state data reporting means is selected from among the electronic mail transmitting means, file forming means, and print means, and by a given reporting method designated, the resource states are reported.

Thus, in the present invention, the resource data retrieving means accesses the resource control data base to collect the attributive data on the resources in the network. The resource state data collecting means collects the states of resources. The thus collected data are registered in the resource data control table means. All the data necessary for supervising the resources in the network are collected at one location. Accordingly, in the network resource supervising system of the invention, the resources distributed in the network can be supervised in a centralized manner. The history data on the states of the resources can be reported to the supervisor by a given communication means. Accordingly, the work to sequentially search the states of the resources is improved. Further, the supervisor can go back to the past to understand the states of resources. He can quickly take the best measure.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

DETAILED DESCRIPTION OF THE PREFERRED EMBODIMENTS

Figure 1:
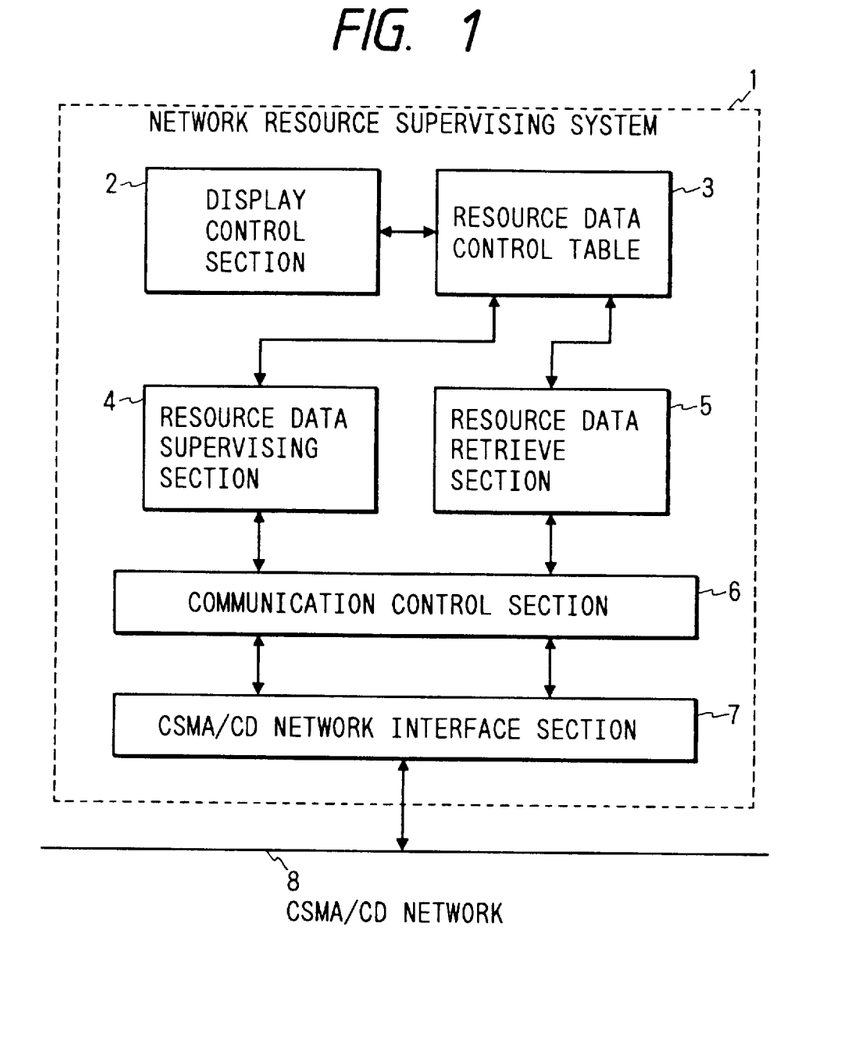
FIG. 1 is a block diagram showing a network resource supervising system according to a first embodiment of the present invention.

FIG. 1 is a block diagram showing a network resource supervising system according to a first embodiment of the present invention. As shown, a network resource supervising system 1 is connected to a network, for example, a CSMA/CD network 8. In the network resource supervising system 1, a resource data retrieve section 5 collects attributive data on the respective resources in the network by accessing resource control data base (not shown) installed in the network, through a communication control section 6 and a CSMA/CD network interface section 7. A resource data supervising section 4 monitors, through a communication control section 6, the data on various types of resources stored in the resource data control table 3, and checks some change in the resource data, if occurred. A resource data control table 3 stores, in given formats, attributive data of the resources collected by the resource data retrieve section 5 and state data of the resources collected by the resource data supervising section (resource state data collecting means) 4. A display control section 2, including a suitable display, such as a CRT, displays state data of the resources stored in the resource data control table 3. The communication control section 6 contains a proper protocol for making an access to desired resources in the network. (The protocol may be a specific protocol for resource access. Where a plurality of protocols in the network are used, a protocol adaptable for them may be used.) A CSMA/CD network interface section 7 controls the connection of the communication control section 6 with the CSMA/CD network 8. The network resource supervising system 1 may be specially installed, as a server operating exclusively for a given function, in the CSMA/CD network B. If required, the system may be designed so that the function is assigned to any other suitable server in the CSMA/CD network 8.

Figure 2:
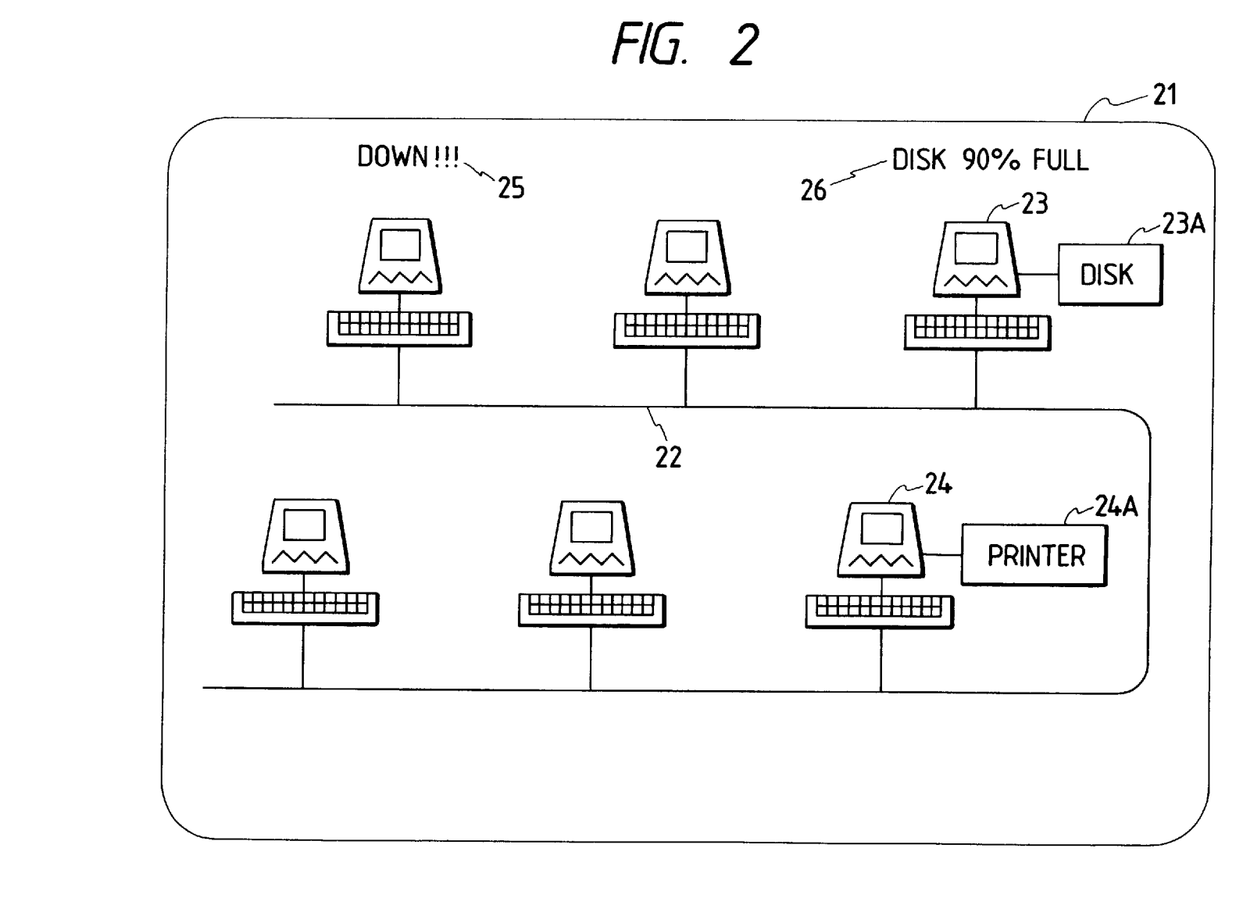
FIG. 2 is a diagram showing an example of display contents in display screen of a display controller section in the network resource supervising system of FIG. 1.

FIG. 2 is a diagram showing an example of display contents in the display screen 21 of the display control section 2 in the network resource supervising system of FIG. 1. In FIG. 2, various types of resources, such as servers 23 and 24, distributed in the network are displayed. When seeing the display screen, a supervisor can understand the present states of the resources; for example, the disk 23A and the printer 24A are installed at locations where they are required. If necessary, specific states of the respective resources in the network can be visually presented with characters and figures. For example, if specific displays, such as "Down !!!" (designated by reference numeral 25) and "Disk 90% full !!!" (designated by 26), are presented, the supervisor's attention can be called to them.

Figure 3:
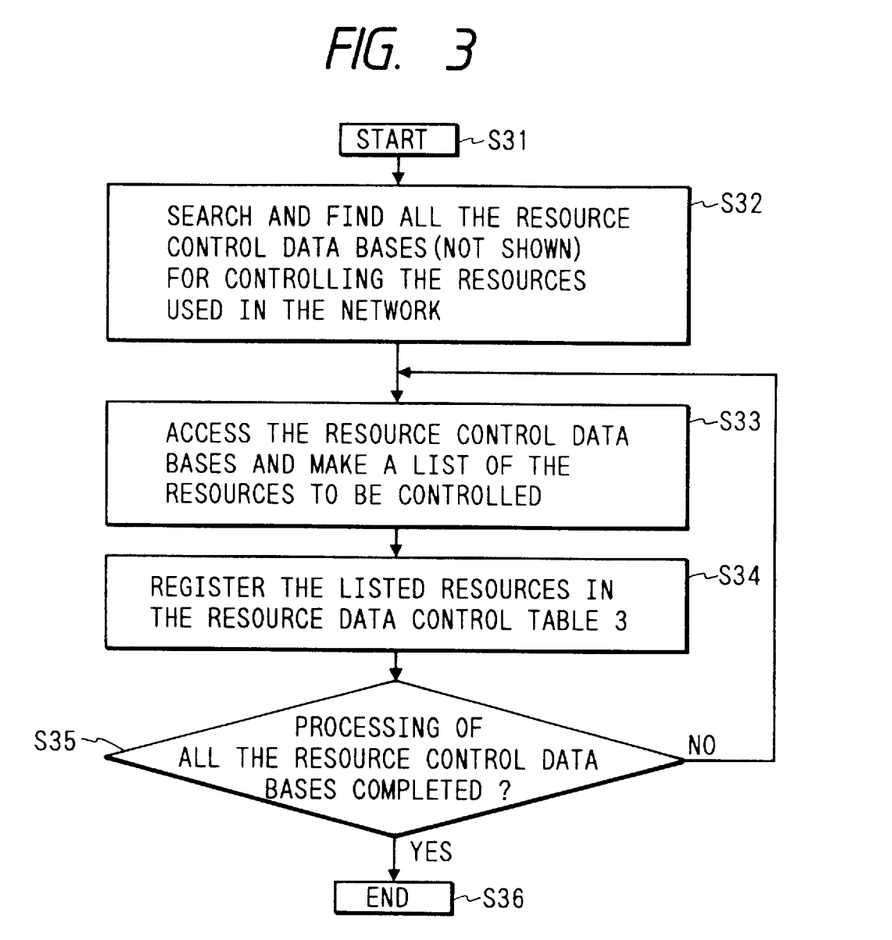
FIG. 3 is a flowchart showing the operation of a resource data retrieve section in the network resource supervising system.
Figure 4:
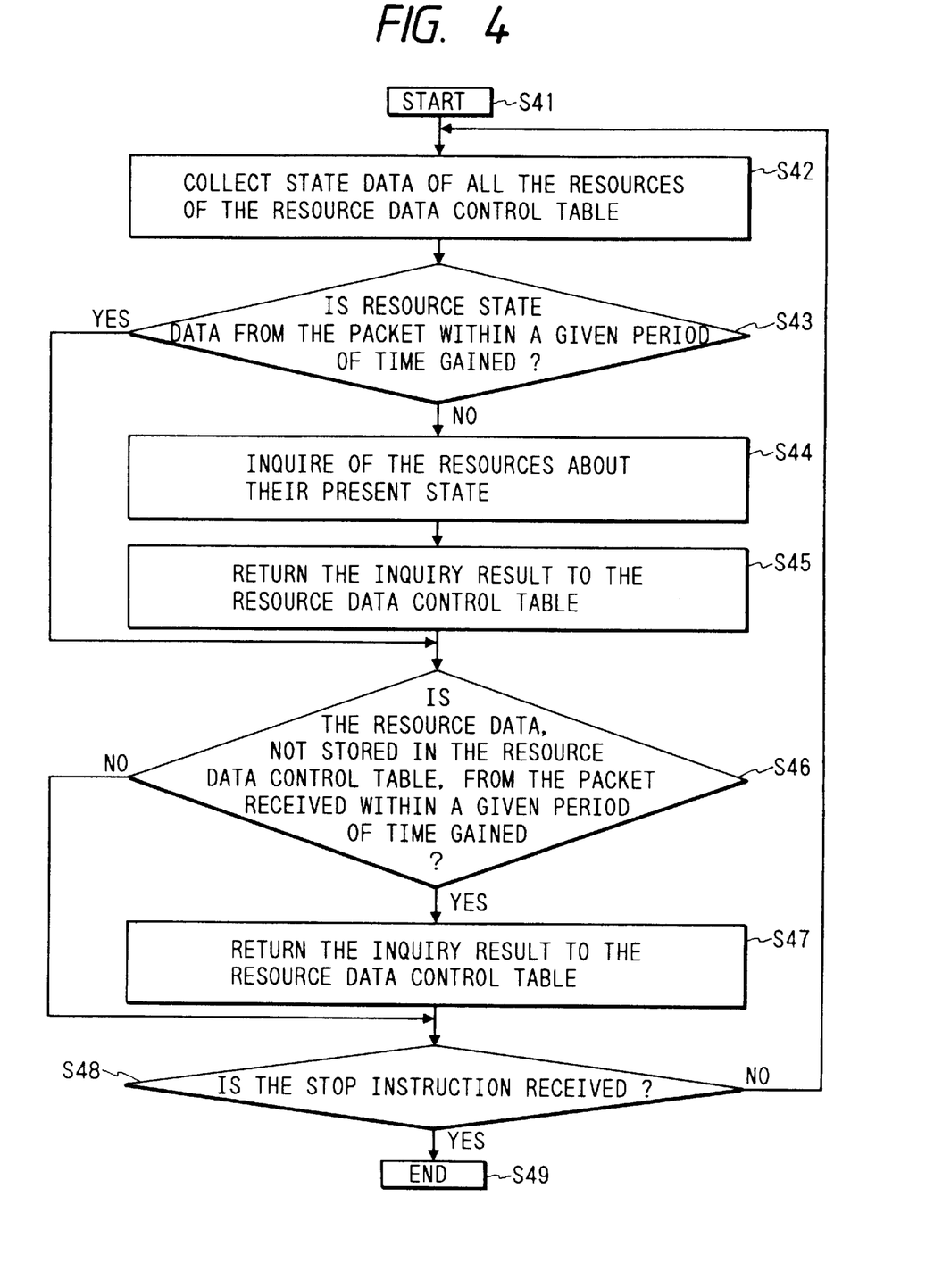
FIG. 4 is a flowchart showing the operation of a resource data supervising section of the same system.

FIG. 3 is a flowchart showing the operation of the resource data retrieve section 5 in the network resource supervising system. In the operation, to register given resources in the resource data control table 3, the resource data retrieve section 5 searches the resources in the network. In the flowchart of FIG. 4, the resource data retrieve section 5 starts to operate (S31). Then, it searches and finds all the resource control data bases (not shown) for controlling the resources in the network (S32). In this instance, the resource control data bases are distributed in the network. When one resource control data base is accessed, other resource control data bases are automatically searched and can be used. Accordingly, all the resource control data bases, if they are located in the network accessible, can be searched. (For the resource control data base of this type, reference is made to the description of "Clearing House Service" on pp 225 to 226 in the article, "Local Area Network".

In the subsequent step S33, the resource data retrieve section accesses all the data bases successively, and collects resource data as data of the resources to be controlled, and attributive data of the resources, such as names of the resources and network addresses. Afterwards, it registers the collected resource data into the resource data control table 3 (S33). In the next step S35, it determines whether or not the processing of all the data bases for resource control is completed. If the answer is Y (affirmative), it goes to step S36 where the operation thus far performed ends. If the answer in step S35 is negative, it returns to step S33, and repeats the operations steps succeeding to step S33 and the subsequent ones.

FIG. 4 is a flowchart showing the operation of a resource data supervising section of the same system. In the flowchart of FIG. 4, the resource data supervising section 4 starts to operate (S41). The resource data supervising section collects state data of all the resources registered in the resource data control table 3 (S42). Two resource data collecting methods are employed in this embodiment. The first method is to passively gain state data of the resources by monitoring data flowing through the network. The second method is to actively gain the state data by inquiring of the resources about their states.

In the first method of passively gaining the state data, the respective resources in the network sends data indicative of their operating state at given time intervals. When a trouble occurs, the operating state data is not sent. The resource data supervising section checks whether or not state data of the resources in the network is gained from the packet data received through the CSMA/CD network 8 within a given period of time (S43). If the answer is Y (affirmative), it skips to step S46 to be given later.

If the answer is N (negative), it advances to step S44 where it actively searches the resource state data. Specifically, the resource data supervising section 4 inquires of the resources of the resource data control table 3 about the present states of the resources. Then, it stores the resource state data as the result of the search into the resource data control table 3 (step S45).

In the subsequent step S46, it checks whether or not the resource data, which is not found in the resource data control table 3, is gained from the packet data received within a given period of time. If the answer is N (negative), that is, the resource state data gained anew is the same as that already stored, it skips to step S48 to be given later.

If the answer is Y (affirmative) in step S46, the resource state data is new, thereby updating the resource data control table 3 (S47).

In the subsequent step S48, the resource data supervising section checks whether or not there is an instruction to stop the resource data supervising section 4. If the answer is Y (affirmative), it goes to step S49 where it stops its operation. If the answer is N (negative) in step S48, it returns to step S42, and the operation thus far made is repeated.

Figure 5:
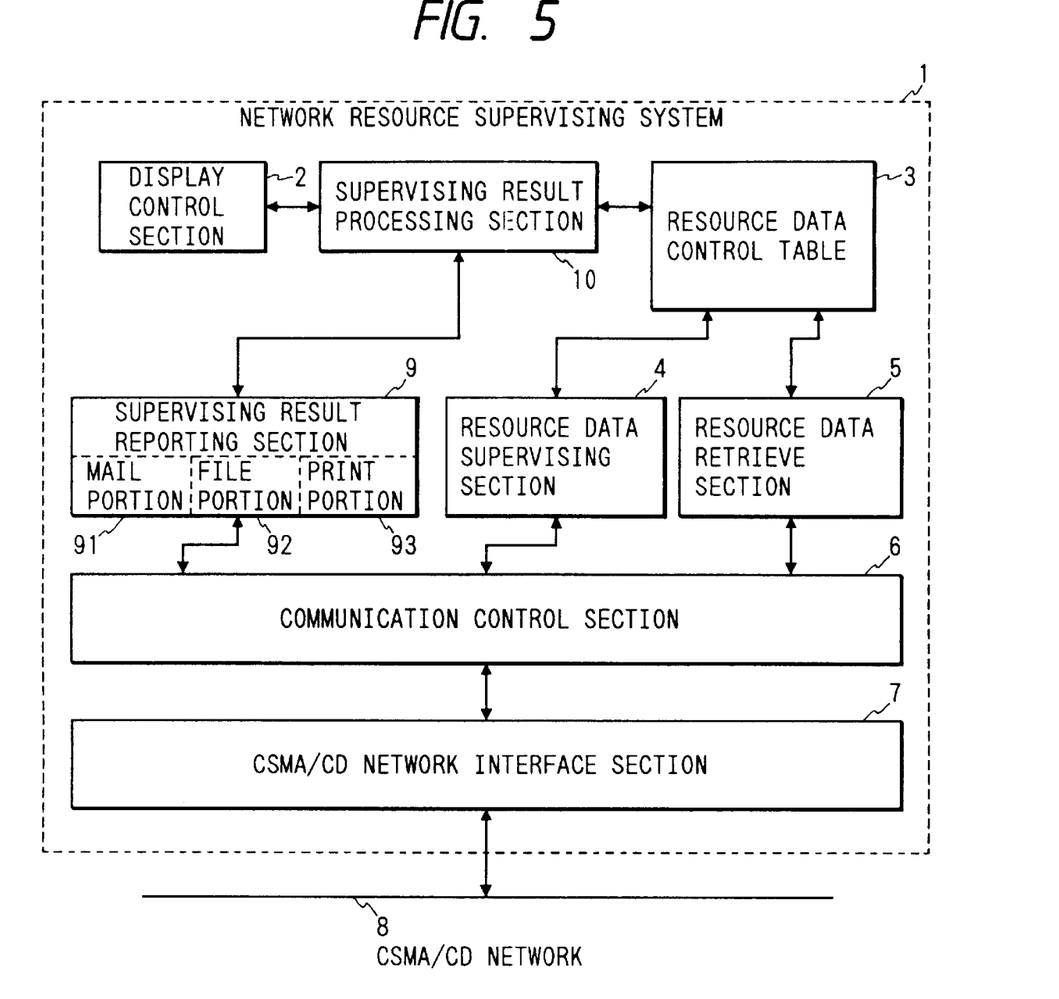
FIG. 5 is a block diagram showing a network resource supervising system according to a second embodiment of the present invention.

FIG. 5 is a block diagram showing a network resource supervising system according to a second embodiment of the present invention. The network resource supervising system of the second embodiment basically resembles in construction the network resource supervising system of FIG. 1 as the first embodiment. Accordingly, description to follow will be given placing emphasis on only the portions of the second embodiment, which are different from the first embodiment. In FIG. 5, like reference numerals will be used for designating like or equivalent portions in FIG. 1.

The second embodiment is characterized by a supervising result reporting section 9 for transferring a report on the supervising result to the display control section 2 or the supervising result reporting section 9 when the data stored in the resource data control table 3 are analyzed and as the analysis result, some report must be transferred to a system supervisor, at least one means for reporting the supervising result, which is selected from among an electronic mail portion 91, an electronic file portion 92, and an electronic print portion 93, and a supervising result reporting section 9 for reporting a given supervising result to the system supervisor by using a specified means (selected from among the mail, file, and print portions 91, 92 and 93 by a user, for example).

The display contents of the display screen of the display control section 2 of the second embodiment is the same as that of FIG. 2 in the first embodiment.

In the illustration, the mail, file, and print portions 91 to 93 are contained in the supervising result reporting section 9. If required, those portions may be independently provided.

Figure 6:
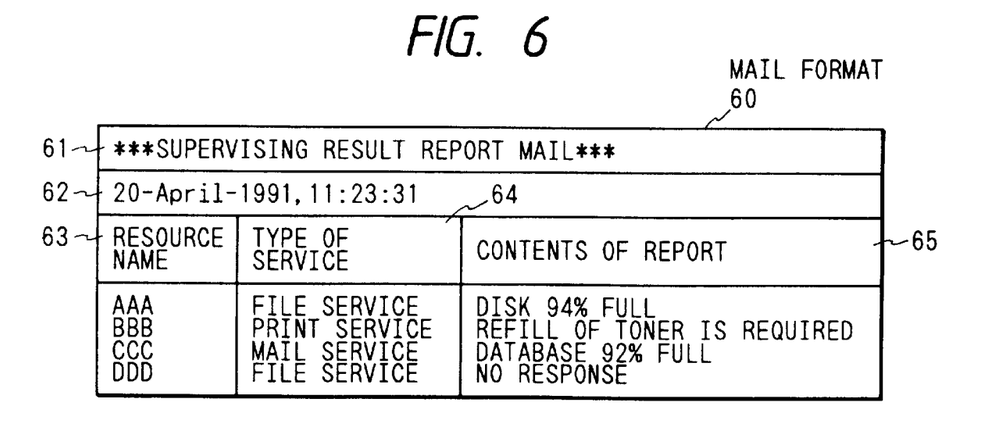
FIG. 6 is a diagram showing an example of a mail format to report the supervising results by a mail portion in the network resource supervising system of FIG. 5.

FIG. 6 is a diagram showing an example of a file format to report the supervising result by a mail portion in the network resource supervising system of FIG. 5. In a mail format of FIG. 6, a heading field 61 indicates a mail for reporting the supervising results; a date field 62, date of the mail operation performed; a resource name field 63, the name of resource; a type field 64, the type of given service; and a report field 65 describes the contents of report. If the name of resource is "AAA", for example, the type of its service is "File service", and the contents of its report is "Disk 94% full".

Figure 7:
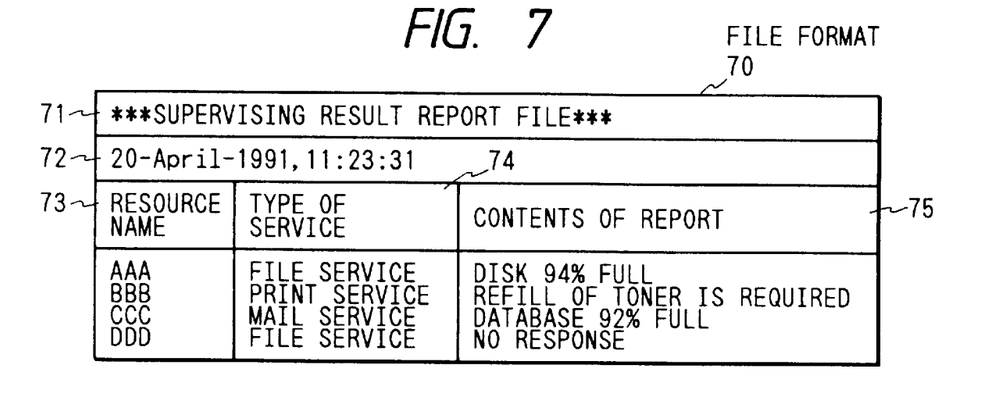
FIG. 7 is a diagram showing an example of a file format to report the supervising results by a file portion of the network resource supervising system.

FIG. 7 is a diagram showing an example of a file format to report the supervising results by a file portion of the network resource supervising system. In a file format of FIG. 7, a heading field 71 indicates a file for reporting the supervising results; a date field 72, date of the file operation performed; a resource name field 73, the name of resource; a type field 74, the type of given service; and a report field 75 describes the contents of report.

Figure 8:
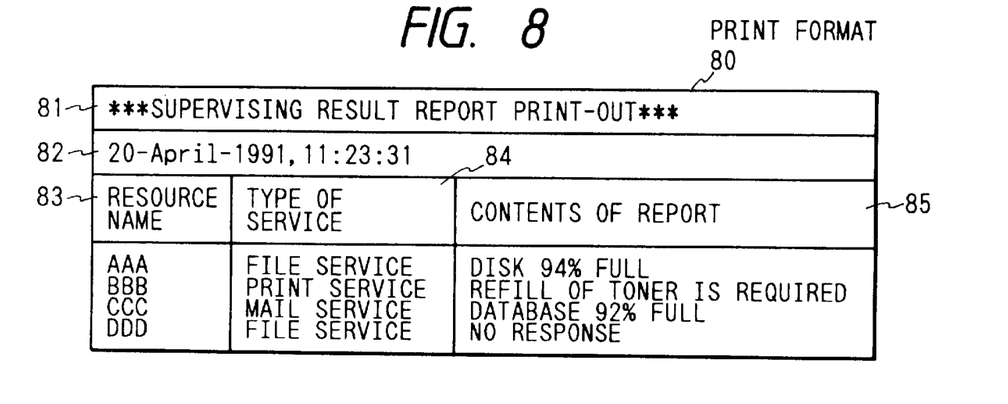
FIG. 8 is a diagram showing an example of a print format to report the supervising results by a printer portion of the supervising system.

FIG. 8 is a diagram showing an example of a print format to report the supervising results by a printer portion of the supervising system. In a print format 80 of FIG. 8, a heading field 81 indicates a print-out for reporting the supervising results; a date field 82, date of the print operation performed; a resource name field 83, the name of resource; a type field 84, the type of given service; and a report field 85 describes the contents of report.

The resource data retrieve section 5, which is for searching resources in the network in order to register given resources in the resource data control table 3, and the communication control section 6 operate like those in the first embodiment of FIGS. 3 and 4. Therefore, no description of the operation of them will be given here.

Figure 9:
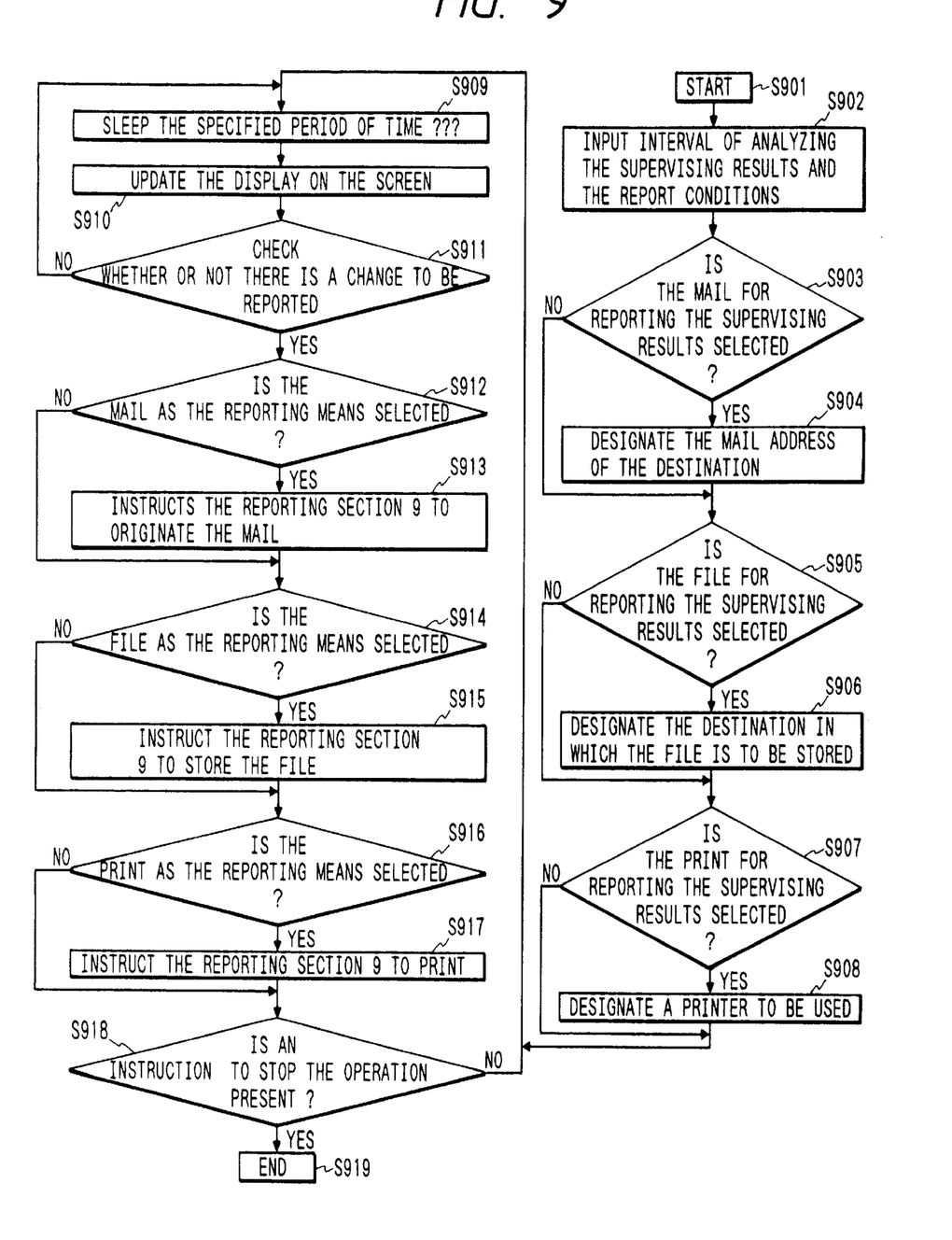
FIG. 9 is a flowchart showing the operation of a supervising result processing section in the supervising system.

FIG. 9 is a flowchart showing the operation of a supervising result processing section 10 in the supervising system. In the flowchart, the supervising result processing section 10 starts to operate (S901). The interval of analyzing the supervising results and report conditions are input (S902). The supervising result processing section checks whether or not the mail is selected for the means for reporting the supervising results. If the answer is Y, that is, the mail is selected, the mail address of the destination is designated (S904). If the answer is N, that is, the mail is not selected, the processing section checks whether or not the file is selected for the reporting means. If the answer is Y, a destination in which the file is to be stored is designated (S906). If the answer is N, the processing section in the next step S907 checks whether or not the print is selected for the reporting means. If the answer is Y, the printer to be used is designated (S908). If the print is not selected (the answer is N), in the next step S909 the designated period of time is slept. The supervising result processing section updates the display on the screen (S910), and checks if there is a change to be reported (S911). If the answer is N, the processing section returns to step S909. If the answer is Y, step S912 is executed to check if the mail is selected for the reporting means. If the mail is selected (the answer is Y), step S913 is executed to instruct the supervising result reporting section 9 to originate the mail. If the answer is N in step S912, step S914 is executed to check if the file is selected for the reporting means. If the file is selected (the answer is Y), step S915 is executed to instruct the reporting section 9 to store the file. If the answer is N in step S914, step S916 is executed to check if the print is selected for the reporting means. If the print is selected (the answer is Y), step S918 is executed instruct the resource data retrieve section 5 to print. The subsequent step S918 is executed to check if there is an instruction to stop. If the answer is Y, step S919 is executed where the operation ends. If the answer is N, control returns to step S909 and repeats the given operation. If the answer is N in step S916, step S918 is executed to check there is an instruction to stop.

As seen from the foregoing description, in the network resource supervising system of the invention, a supervisor can grasp states of a plurality of resources distributed in a network. The work to sequentially search the respective resources is improved. Additionally, specific operating states when the data processing is performed in the network can be exactly detected, and the occurrence of trouble and its state can be grasped also exactly.

Further, the network resource supervising system of the invention is cable of reporting data including history data on the past states of the resources distributed in the network. This enables a specific supervisor to grasp the states of resources. The work to sequentially search the respective resources is improved. In addition to the improvement, specific operating states when the data processing is performed in the network can be exactly detected, and the occurrence of trouble and its state can be grasped also exactly.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A network resource supervising system for supervising hardware resources distributed at different locations in a network, said network resource supervising system being coupled with said network at one of said different locations, said network communicating using a packet signal and having at least one resource control data base for storing information on said hardware resources, workstations connected to said network obtaining said information from said resource control data base and performing jobs using said hardware resources based on said information thus obtained, the network resource supervising system comprising:

resource means for accessing and retrieving data for searching said at least one resource control data base and for collecting attribute data on the hardware resources at said different locations in the network;

resource state data collecting means for collecting state data representing states of the hardware resources at said different locations using said packet signal communicated through said network based on said attribute data;

resource data control table means for storing therein in a given format the attribute data of the hardware resources collected by the resource means for accessing and retrieving data and the state data of the hardware resources collected by the resource state data collecting means; and     supervising result processing means for checking a change to be reported of the states of the hardware resources based on the state data of the hardware resources stored in the resource data control table means, and informing a user of the changed state data of the hardware resources.

2. The network resource supervising system according to claim 1, wherein said resource state data collecting means stops in response to a stop instruction.

3. The network resource supervising system according to claim 1, wherein the supervising result processing means informs the user at a remote location.

4. The network resource supervising system according to claim 1, wherein the supervising result processing means informs the user of a date field which represents a time at which the state data is collected.

5. The network resource supervising system according to claim 1, wherein the supervising result processing means informs the user of a type field which represents the type of given service.

6. The network resource supervising system according to claim 1, wherein the resource state data collecting means passively collects the state data representing states of the hardware resources by monitoring data flowing through the network.

7. The network resource supervising system according to claim 6, wherein the resource state data collecting means actively collects the state data representing states of the hardware resources by inquiring of the hardware resources about their states if not collected by monitoring the data flowing through the network.

8. A network resource supervising system for supervising hardware resources distributed at different locations in a network, said network communicating using a packet signal and supervising system being coupled with said network at one of said different locations, said network having at least one resource control data base for storing information on said hardware resources, workstations connected to said network obtaining said information from said resource control data base and performing jobs using said hardware resources based on said information thus obtained, the network resource supervising system comprising:

resource means for accessing and retrieving data for searching said at least one resource control data base and for collecting attribute data on the hardware resources in the network;

resource state data collecting means for collecting state data representing states of the hardware resources at said different locations using said packet signal communicated through said network based on said attribute data;

resource data control table means for storing therein in a given format the attribute data of the hardware resources collected by the resource means for accessing and retrieving data and the state data of the hardware resources collected by the resource state data collecting means;

at least one of electronic mail means for transmitting the state data of the hardware resources that are stored in the resource data control table means, as an electronic mail, file forming means for forming the state data of the hardware resources that are stored in the resource data control table means, into a file, and print forming means for printing out the state data of the hardware resources that are stored in the resource data control table means;

means for designating a method of reporting states of the hardware resources by selecting one of the electronic mail transmitting means, file forming means, and print forming means; and     supervising result processing means for checking a change to be reported of the states of the hardware resource based on the state data of the hardware resources stored in the resources data control table means, and informing a user of the changed state data of the hardware resources by means of one method selected by said means for designating a method of reporting states of the hardware resources.

9. A network communicating using a packet signal and having a plurality of computers distributed at different locations to form a network, the network comprising:

a resource control data base located on at least one computer in the network for controlling hardware resources coupled with the network, the computers in the network retrieving data from the resource control data base and communicating with each other on the basis of the retrieved information;

resource data retrieving means comprised of a search section for searching said computers in the network having the resource control data base and an access section for accessing the computers having the resource control data base for retrieving attribute data of said hardware resources;

resource state data collecting means for collecting state data representing states of the hardware resources at said different locations using said packet signal communicated through said network resources at said different locations through said network based on said attribute data retrieved by said resource data retrieving means;

resource data control table means for storing the attribute data of the hardware resources collected by the resource data retrieving means and the state data of the hardware resources collected by the resource state data collecting means;

supervising result processing means for processing the state data of the hardware resources stored in the resource data control table means at given time intervals; and data display means for displaying to a user the state data processed by the supervising result processing means.

10. The network resource supervising system according to claim 1, wherein the supervising result processing means includes electronic mail means for transmitting the state data of the respective resources that are stored in the resource data control table means, in a form of the electronic mail.

11. The network resource supervising system according to claim 1, wherein the supervising result processing means includes file forming means for forming the state data of the respective resources that are stored in the resource data control table means, into a file.

12. The network resource supervising system according to claim 1, wherein the supervising result processing means includes print forming means for printing out the state data of the respective resources that are stored in the resource data control table means.

13. The network resource supervising system according to claim 9, in which the supervising result processing means includes interval setting means for setting the given time intervals.

14. The network resource supervising system according to claim 9, wherein the data display means includes a display screen that presents a diagram of network configuration indicative of the hardware resources distributed at different locations in said network and the states of said hardware resources with characters and figures.

* * * * *